June 7, 1932.   C. DORNIER   1,861,596
WING FOR AIRPLANES
Filed May 6, 1931
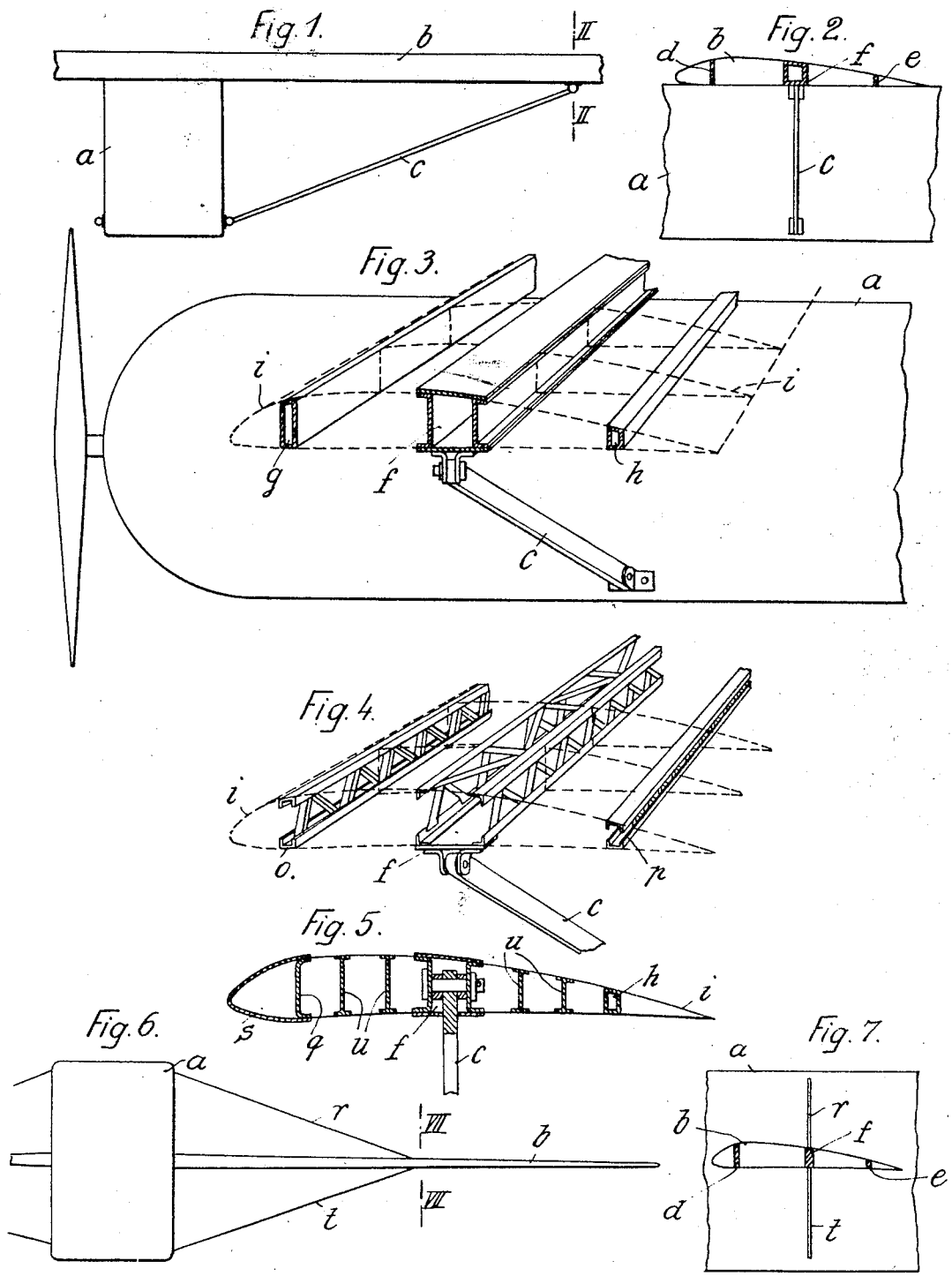
Inventor:
Claude Dornier
by Karl Leuhausig
Atty.

Patented June 7, 1932

1,861,596

UNITED STATES PATENT OFFICE

CLAUDE DORNIER, OF FRIEDRICHSHAFEN-ON-THE-BODENSEE, GERMANY, ASSIGNOR OF ONE-HALF TO DORNIER-METALLBAUTEN G. M. B. H., OF FRIEDRICHSHAFEN-ON-THE-BODENSEE, GERMANY

WING FOR AIRPLANES

Application filed May 6, 1931, Serial No. 535,313, and in Germany May 23, 1930.

My invention relates to airplanes and more particularly to the bracing of the wings.

It is an object of my invention to so design a wing that it has the properties of a self-supporting wing without requiring an excessively heavy base. To this end I provide not less than three transversal spars in the wing and brace only the central spar.

Normally wings are provided with spars extending transversely to the direction of flight, ribs extending in the direction of flight and a covering for the entire structure. Forces are transmitted from the wing to the fuselage only at the wing base or, in addition thereto by tension and pressure members, such as rigid struts or mere tension members, such as wires or cables which connect the spars with the fuselage. Unless the wings are of the self-supporting type throughout, several struts or wires connect each side of the fuselage with the wings and these struts or wires greatly increase the dynamic resistance. On the other hand it is not always desirable to dispense with struts and bracing wires altogether, because self-supporting wings are heavy and comparatively deep at the base which also increases the dynamic resistance.

By bracing in a wing, having not less than three spars, only the central spar, I obtain a wing which is almost as strong as a self-supporting wing, but is not excessively deep at the base. The air forces acting thereon during a dive are absorbed principally by the spars near the leading and trailing edges in cooperation with the usual transverse bracings, i. e. ribs extending in the direction of flight. On the other hand the air forces arising during forward flight and the inertia forces occurring when landing are absorbed by one of the spars intermediate the front and rear spars, in the case of three spars by the central spar, and are transmitted to the fuselage by a tension-and-compression strut or by mere tension members.

If tension members are provided instead of a single strut, one of them may extend upwardly, the other one downwardly from the central spar. In any case the dynamic resistance is greatly reduced by the elimination of the second one of the usual pair of struts or braces one hitherto provided on each side of the fuselage.

The spar to which the strut or tension member is connected, must be very strong and is preferably designed as a box girder with sheet metal or lattice-work members. In addition to the central or braced spar not less than two spars must be provided, one near the leading, the other near the trailing edge, which are also preferably of the box or lattice-work type. Any number of subsidiary spars may be provided intermediate the three principal spars. All spars are connected by ribs in the usual manner. If desired the spar near the leading edge may be combined with the front section of the wing to form a self-contained structural unit.

In the drawing affixed to this specification and forming part thereof wings embodying my invention are illustrated diagrammatically by way of example.

In the drawing

Fig. 1 is an end elevation showing a fuselage and a portion of a wing having three spars and a tension-and-compression strut for the central spar, Fig. 2 is a section on the line II—II in Fig. 1, Fig. 3 is a perspective illustration of a wing having three box-girder spars, in combination with a fuselage, Fig. 4 is a similar view of a wing the spars in which are designed as lattice-work girders, Fig. 5 is a cross section of a wing in which the middle and rear spars are of the box-girder type, while the spar near the leading edge is combined with the front section of the wing to form a structural unit, Fig. 6 is an elevation of a fuselage and a wing connected by tension wires, and Fig. 7 is a section on the line VII—VII in Fig. 6.

Referring to the drawing, and first to Figs. 1 and 2, $a$ is a fuselage, $b$ is one of its wings, $f$ is the middle spar, $d$ and $e$ are the front and rear spars and $c$ is a strut by which the central spar $f$ is connected to and braced relative to the fuselage $a$.

In Fig. 3 $a$ is the fuselage with a tractor propeller at its leading end, f is the middle spar with the strut c as described, g and h are the front and rear spars and i are the ribs. The middle spar f is a box girder built up from sheet metal and channel sections. The spars g and h are also designed as box girders. The strut c extends in the central vertical plane of the middle girder f.

In Fig. 4 the middle spar f to which the strut c is secured, and the front and rear spars o and p are designed as lattice-work girders.

In Fig. 5, the middle spar f to which the strut c is secured, and the rear spar h are designed as box girders, as shown in Fig. 3, while the front spar q is combined with the section S at the leading edge to form a self-contained structural unit. u are subsidiary spars intermediate the front, middle and rear spars.

In Fig. 6, a is the fuselage, and b is one of the wings, with the middle spar f, the front spar d and the rear spar e, as shown in Figs. 1 and 2, but here the strut c is replaced by wires or cables r and t extending respectively from the middle spar f toward the top and the bottom of the fuselage a.

I wish it to be understood that I do not desire to be limited to the exact details of construction shown and described, for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. An airplane having a fuselage and a wing, three spars forming part of the wing structure extending transversely to the direction of flight and an only bracing member connecting the middle spar with said fuselage.

2. An airplane having a fuselage and a wing, three spars forming part of the wing structure extending transversely to the direction of flight the middle spar being designed as a box girder and an only bracing member connecting the middle spar with said fuselage.

3. An airplane having a fuselage and a wing, three spars forming part of the wing structure extending transversely to the direction of flight the middle spar being designed as a sheet metal box girder and an only bracing member connecting the middle spar with said fuselage.

4. An airplane having a fuselage and a wing, three spars forming part of the wing structure extending transversely to the direction of flight the middle spar being designed as a lattice-work box girder and an only bracing member connecting the middle spar with said fuselage.

5. An airplane having a fuselage and a wing, three spars forming part of the wing structure extending transversely to the direction of flight and an only pair of tensional bracing members connecting the middle spar with said fuselage.

In testimony whereof I affix my signature.

CLAUDE DORNIER.